US011071004B2

(12) United States Patent
Gandhi et al.

(10) Patent No.: US 11,071,004 B2
(45) Date of Patent: Jul. 20, 2021

(54) APPLICATION-BASED TRAFFIC MARKING IN A LINK-AGGREGATED NETWORK

(71) Applicant: Cisco Technology, Inc., San Jose, CA (US)

(72) Inventors: Indermeet Singh Gandhi, Bangalore (IN); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 61 days.

(21) Appl. No.: 15/792,614

(22) Filed: Oct. 24, 2017

(65) Prior Publication Data

US 2019/0124545 A1 Apr. 25, 2019

(51) Int. Cl.
| | |
|---|---|
| H04W 28/02 | (2009.01) |
| H04W 36/14 | (2009.01) |
| H04L 12/927 | (2013.01) |
| H04L 12/709 | (2013.01) |
| H04W 36/26 | (2009.01) |
| H04W 36/30 | (2009.01) |
| H04L 12/851 | (2013.01) |
| H04W 84/12 | (2009.01) |

(52) U.S. Cl.
CPC ....... *H04W 28/0268* (2013.01); *H04W 36/14* (2013.01); *H04W 36/26* (2013.01); *H04W 36/30* (2013.01); *H04L 45/245* (2013.01); *H04L 47/24* (2013.01); *H04L 47/805* (2013.01); *H04W 84/12* (2013.01)

(58) Field of Classification Search
CPC . H04W 28/0268; H04W 28/02; H04W 28/00; H04W 28/0205; H04W 28/021; H04W 28/0247; H04W 28/0252; H04W 28/0257; H04W 28/0263; H04W 28/0273; H04W 36/26; H04W 36/24; H04W 36/30; H04L 47/24; H04L 47/10; H04L 47/00; H04L 47/805; H04L 47/80; H04L 47/70; H04L 45/245; H04L 45/26; H04L 45/00
USPC ........................................................ 370/235
See application file for complete search history.

(56) References Cited

U.S. PATENT DOCUMENTS

| | | | |
|---|---|---|---|
| 7,706,741 B2 * | 4/2010 | Patel ..................... | H04H 60/27 348/14.01 |
| 9,571,422 B2 * | 2/2017 | Hui ........................ | H04L 49/20 |

(Continued)

OTHER PUBLICATIONS

Pavan Nuggehalli, "LTE-WLAN Aggregation", IEEE Wireless Communications, Aug. 2016, 3 pages.

(Continued)

*Primary Examiner* — Jeffrey M Rutkowski
*Assistant Examiner* — Luna Weissberger

(57) ABSTRACT

A method for marking network traffic in a link-aggregated network based on an application associated with the traffic. The method comprises receiving, via a cellular wireless network, one or more data packets destined for an electronic device and associated with an application. The method further comprises identifying an application type of the application. The method further comprises determining a priority of the one or more data packets based on the application type. The method further comprises transmitting, to a Wireless Local Area Network (WLAN), the one or more data packets including an indication of the priority for forwarding the traffic.

23 Claims, 8 Drawing Sheets

(56) References Cited

U.S. PATENT DOCUMENTS

| | | | |
|---|---|---|---|
| 9,596,707 B2* | 3/2017 | Zhu | H04W 28/065 |
| 2014/0355427 A1* | 12/2014 | Cheng | H04L 47/24 |
| | | | 370/230 |
| 2015/0189404 A1* | 7/2015 | Pekarske | H04Q 9/00 |
| | | | 340/870.07 |
| 2016/0234124 A1* | 8/2016 | Tomici | H04W 28/08 |
| 2016/0338068 A1 | 11/2016 | Cheng et al. | |
| 2016/0338073 A1* | 11/2016 | Nuggehalli | H04W 74/08 |
| 2016/0338074 A1 | 11/2016 | Chou et al. | |
| 2016/0373958 A1 | 12/2016 | Cao et al. | |
| 2017/0070436 A1* | 3/2017 | Lubenski | H04L 1/1812 |
| 2017/0318501 A1* | 11/2017 | Vikberg | H04W 76/15 |
| 2018/0070288 A1* | 3/2018 | Kim | H04W 74/0858 |

OTHER PUBLICATIONS

Shuo Wang et al., "A Survey on Mobile Edge Networks: Convergence of Computing, Caching and Communications", IEEE Access, Jun. 7, 2017, 23 pages.

Gabriel Brown, "Mobile Edge Computing Use Cases & Deployment Options", Heavy Reading, Jul. 2016, 10 pages.

3GPP Organizational Partners, "3rd Generation Partnership Project; Technical Specification Group Services and System Aspects; Policy and charging control architecture (Release 15)", 3GPP TS 23.203 V15.1.0, Dec. 2017, 261 pages.

3GPP Organizational Partners, "3rd Generation Partnership Project; Technical Specification Group Radio Access Network; Evolved Universal Terrestrial Radio Access (E-UTRA); LTE-WLAN Aggregation Adaptation Protocol ~ (LWAAP) specification (Release 13)", 3GPP TS 36.360 V13.1.0, Mar. 2017, 9 pages.

3GPP Organizational Partners, "3rd Generation Partnership Project; Technical Specification Group Radio Access Network; Evolved Universal Terrestrial Radio Access (E-UTRA); LTE-WLAN Aggregation Adaptation Protocol (LWAAP) specification (Release 14)", 3GPP TS 36.360 V14.0.0, Mar. 2017, 10 pages.

Brocade Communications Systems, Inc., "Brocade and the Mobile Edge", Feb. 2016, retrieved from https://cio.economictimes.indiatimes.com/brocade/mobile-networking#casestudy-register-form, 3 pages.

GSM Association, "Guidelines for IPX Provider networks (Previously Inter-Service Provider IP Backbone Guidelines) Version 13.0", Oct. 17, 2016, 50 pages.

Milan Patel et al., "Mobile-Edge Computing", Introductory Technical White Paper, Sep. 2014, 36 pages.

* cited by examiner

APPLICATION-BASED TRAFFIC MARKING IN A LINK-AGGREGATED NETWORK

TECHNICAL FIELD

The present disclosure relates generally to wireless networks, and in particular, prioritizing data transmitted via wireless networks.

BACKGROUND

Some networks allow user devices to transmit and receive data in accordance with more than one type of radio access technology (RAT), such as cellular-based RATs and WLAN-based RATs. For example, in various implementations, a network allows a user device to simultaneously communicate via a cellular network link and a WLAN link.

BRIEF DESCRIPTIONS OF THE DRAWINGS

For a better understanding of aspects of the various implementations described herein and to show more clearly how they may be carried into effect, reference is made, by way of example only, to the accompanying drawings.

Figure 1:
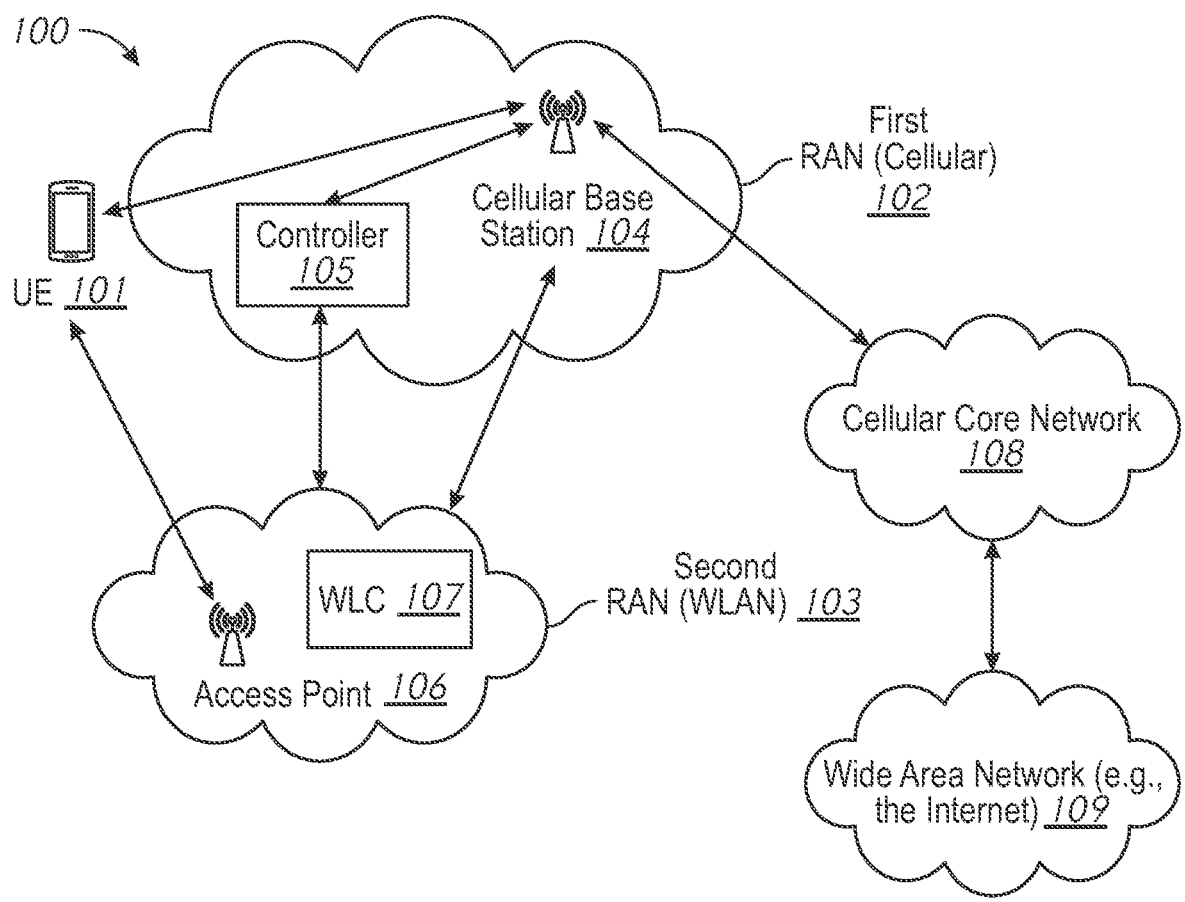
FIG. 1 is a block diagram of a wireless communication environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for marking network traffic in a link-aggregated network based on an application associated with the traffic. The method comprises receiving, via a cellular wireless network, one or more data packets destined for an electronic device and associated with an application. The method further comprises identifying an application type of the application. The method further comprises determining a priority of the one or more data packets based on the application type. The method further comprises transmitting, to a Wireless Local Area Network (WLAN), the one or more data packets including an indication of the priority for forwarding the traffic.

Systems and methods for marking network traffic in a link-aggregated network based on an application associated with the traffic are described herein. The description includes, among others, various LWA (LTE-WLAN aggregation) implementations. The description includes, among others, various LWIP (LTE WLAN Radio Level Integration with IPsec Tunnel) implementations.

FIG. 1 is a block diagram of a wireless communications environment 100. The wireless communication environment includes a UE 101 (e.g., cell phone, tablet, laptop, etc.) in wireless communication with two radio access networks (RANs), a first RAN 102 and a second RAN 103. Either (or both) of the first RAN 102 and the second RAN 103 can provide the UE 101 with connectivity to a wide area network (WAN) 109 (e.g., the Internet). In various implementations, the UE 101 has multiple wireless radios, enabling it to communicate with the first RAN 102 and the second RAN 103.

Although the wireless communication environment 100 of FIG. 1 depicts two RANs 102, 103, it is to be appreciated that various wireless communication environments include more than two RANs. Similarly, although only a single UE 101 is illustrated in FIG. 1, it is to be appreciated that various wireless communication environments include multiple UEs.

The first RAN 102 and the second RAN 103 each implement a Radio Access Technology (RAT). In various implementations, the RAT of the first RAN 102 is a cellular RAT (e.g., a 3GPP defined standard, such as 3G, 4G, LTE, 5G), and the RAT of the second RAN 103 is a WLAN RAT (e.g., IEEE 802.11 standards, such as WiFi). Because the wireless communication environment 100 includes multiple RANs implementing different RATs, the wireless communication environment may be referred to as a "heterogeneous wireless network (HWN)" and/or "heterogeneous network (Het-Net)." In various implementations, the first RAN 102 operates in an unlicensed spectrum either in addition to operating in a licensed spectrum (e.g., LTE-U) or as an alternative to operating in a licensed spectrum (e.g., MulteFire). This allows the first RAN 102 to increase its coverage by using unlicensed bands concurrently used by the second RAN 103. For example, the first RAN 102 can use an unlicensed 5 GHz band commonly utilized in WiFi networks.

The first RAN 102 includes a cellular base station 104 (e.g., eNodeB in LTE or gNodeB in 5G) that provides the UE 101 with connectivity to the WAN 109 (e.g., the Internet). Although one cellular base station 104 is depicted, it is to be appreciated that the first RAN 102 can include more than one cellular base station 104.

Two network links, a UE-to-WLAN link and UE-to-cellular link, are aggregated at the cellular base station 104. This provides the UE 101 with connectivity to the WAN 109 in two ways: (1) through a cellular core network 108 (e.g., "Evolved Packet Core (EPC)" in LTE) and (2) through the WLAN and the cellular core network 108. The cellular base station 104 transmits and receives traffic to and from the second RAN 103 through one or more IP (Internet Protocol) traffic flow channels. For example, in an LTE deployment, the IP traffic flows channels are known as bearers or bearer channels.

The cellular base station 104 can schedule traffic destined for the UE 101 via the cellular-to-UE link and the WLAN-to-UE link, based on measured conditions at the first RAN 102 and the second RAN 103, and based on feedback from the second RAN 103. In various implementations, the cellular base station 104 schedules traffic in accordance with a determination that a comparison between the measured conditions at the first RAN 102, the measured conditions at the second RAN 103, and/or the feedback from the second RAN 103 satisfies certain criteria. The conditions include but are not limited to WLAN identifiers, RSSI (Received Signal Strength Indicator), number of connected UEs to the RAN, backhaul rate, admission capacity, channel utilization, etc. For example, if the cellular base station 104 measures that the first RAN 102 (cellular) was near capacity and the second RAN 103 (WLAN) was at 50% capacity, then the cellular base station could decide to route traffic destined for the UE 101 through the WLAN-to-UE link. In various implementations, conditions of at least one of the first RAN 102 or the second RAN 103 are measured at device separate from the cellular base station 104. For example, in various implementations, an external controller measures conditions of at least one of the first RAN 102 or the second RAN 103, and provides the measurements to the cellular base station 104.

The cellular base station 104 can schedule UE-destined traffic through the WLAN link according to a number of implementations. In various implementations, traffic scheduled to be routed through the WLAN link can be encapsulated at the cellular base station 104 according to a protocol so as to render the traffic WLAN-compatible, without having to modify the WLAN MAC (media access control). In various implementations, the routed traffic includes, among other things, data, identification information, and traffic priority. For example, in various LTE-deployment implementations, packet data convergence protocol (PDCP) protocol data units (PDUs) are encapsulated in LTE-WLAN Aggregation Adaptation Protocol (LWAAP) and sent to the WLAN.

In various implementations, the cellular base station 104 provides the encapsulated traffic over an Ethernet link to a WiFi access point. The WiFi access point provides the encapsulated traffic to the second RAN 103.

Figure 2:
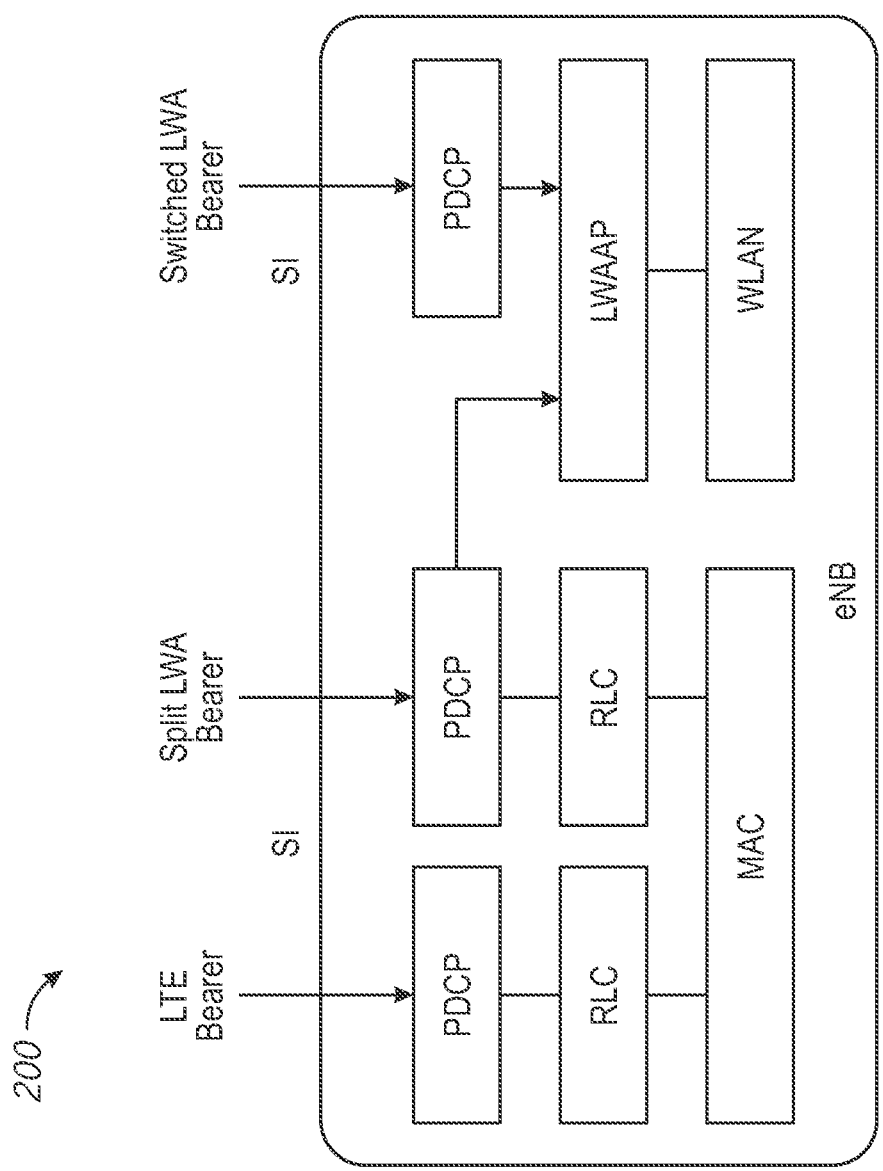
FIG. 2 depicts a co-located system wherein a cellular base station shares an enclosure with an access point and/or a Wireless LAN controller (WLC) according to various implementations.

In some implementations, the cellular base station 104 is integrated (e.g., "collocated") with an access point 106 and/or a Wireless LAN controller (WLC) 107. FIG. 2 depicts an example of a collocated implementation of an LTE deployment. Although FIG. 2 depicts an LTE deployment, it is to be appreciated that the cellular base station 104 can be collocated with the access point 106 and/or WLC 107 in accordance with various implementations disclosed in this application.

Figure 3:
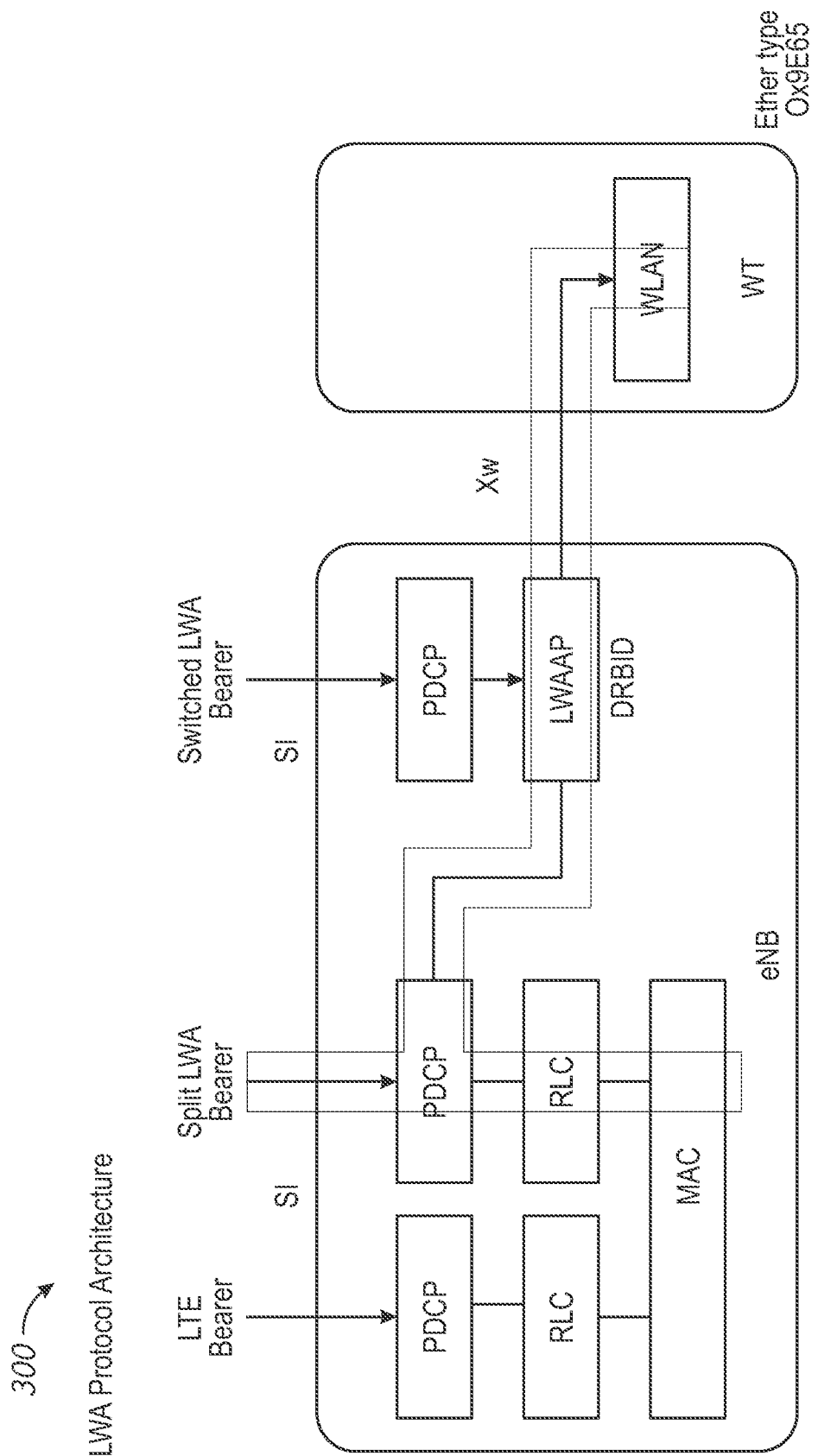
FIG. 3 depicts a non-co-located system wherein a cellular base station is separate from an access point and Wireless LAN controller (WLC) according to various implementations.

In some implementations, the cellular base station 104 is separate from the access point 106 and WLC 107 (e.g., "non-collocated"). Thus, traffic travels from the cellular base station 103 to the WLAN, for example, via a standardized interface over one or more IP traffic flow channels. For example, in an LTE deployment, traffic flows over bearers through a standardized interface called "Xw." FIG. 3 depicts an example of a non-collocated implementation for an LTE deployment. Although FIG. 3 depicts an LTE deployment, it is to be appreciated that the cellular base station 104 can be collocated with the access point 106 and/or WLC 107 in accordance with various implementations disclosed in this application.

The first RAN 102 includes a controller 105. Although one controller 105 is depicted, it is to be appreciated that the first RAN can include more than one controller 105. The controller 105 provides, to the second RAN 103, traffic priority based on an application associated with the traffic, and the second RAN 103 can treat the incoming traffic in accordance with the traffic priority. The controller 105 is depicted as being coupled to but separate from the cellular base station 104. However, some or all of the components of the controller 105 can be co-located within the same enclosure as the cellular base station 104 in various implementations. In other words, functionality of the controller 105 can be implemented at the cellular base station 104.

In various implementations, some or all of the components of the controller 105 reside at a node within a cellular core network 108. For example, in various implementations, the controller 105 resides at a gateway that provides connectivity the UE 101 with connectivity to an external packet data network (e.g., WAN 109). For example, in various implementations, the controller 105 can reside at a PGW (Packet Data Network Gateway) in an LTE deployment.

In various implementations, some or all of the components of the controller 105 reside at a server integrated at the first RAN 102. The server functions in part to provide computational and storage support to the first RAN 102. For example, in various implementations, the server is a mobile edge computing (MEC) server. In some implementations, the server is co-located with the cellular base station 104. In some implementations, the server is separate from the cellular base station 104.

The wireless communication environment 100 includes a second RAN 103 (WLAN). In various implementations, the second RAN 103 includes an access point 106 that provides the UE 101 with connectivity to the first RAN 102. In some implementations, the access point 106 communicates with the controller 105 and/or the cellular base station 104 of the first RAN 102. The access point 106 is IEEE 802.11 compliant (e.g. WiFi compliant). In various implementations, the second RAN 103 includes a Wireless LAN Controller (WLC) 107 that communicates with the controller 105 and/or the cellular base station 104 of the first RAN 102. The access point 106 and the WLC 107 can work alone or in conjunction to communicate with the controller 105 and/or the cellular base station 104 of the first RAN 102.

Figure 4:
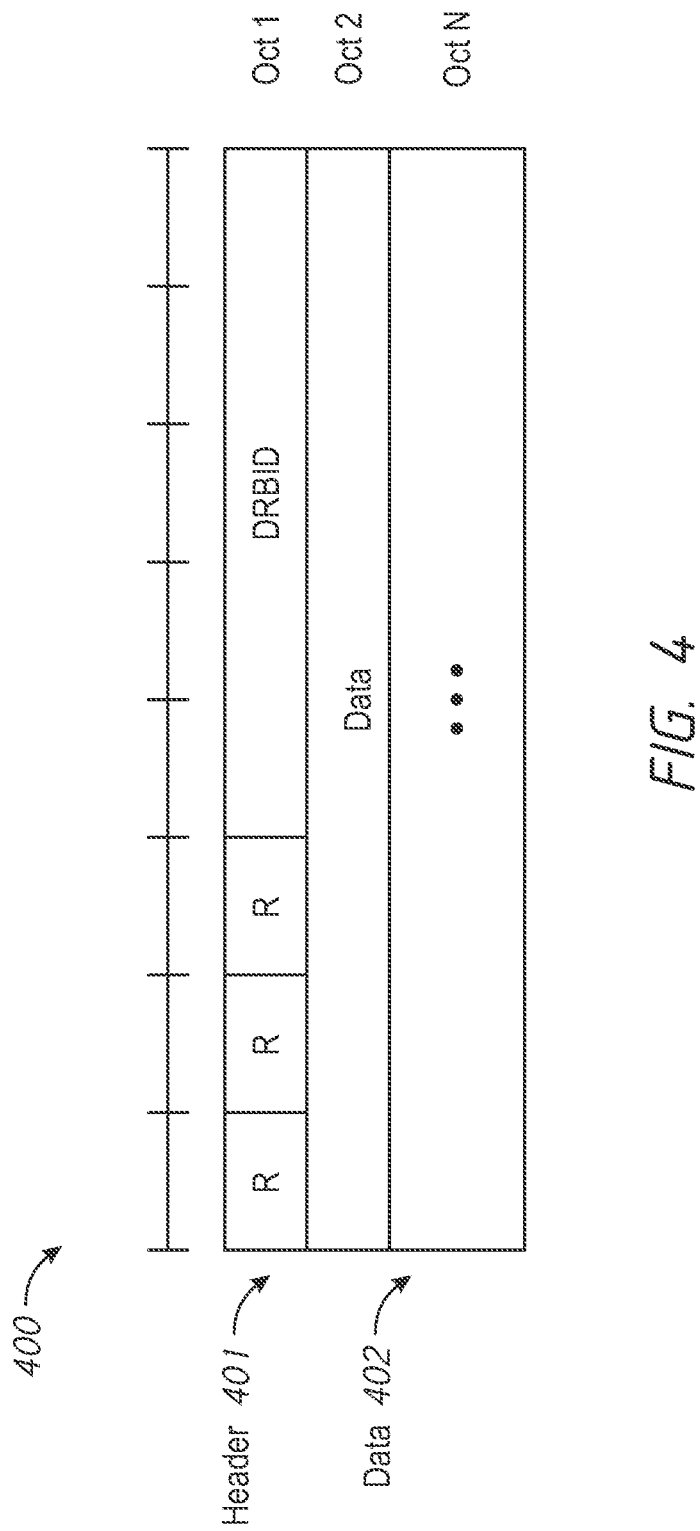
FIG. 4 depicts a representation of an exemplary encapsulated traffic unit in a LWA (LTE-WLAN aggregation) deployment according to various implementations.

FIG. 4 depicts a representation of an exemplary encapsulated traffic unit 400 in an LWA deployment in accordance with various implementations. The encapsulated traffic unit 400 is transmitted between a cellular network and a WLAN. In various implementations, traffic is encapsulated according to LWAAP (LTE-WLAN Aggregation Adaptation Protocol). The encapsulated traffic unit 400 includes a header 401 and a data field 402. The header 401 includes a data radio bearer ID field (DRBID) including identification information. The encapsulated traffic unit 400 includes information indicating priority of data in the data field 402. In various implementations, the priority of data includes a quality of service (QoS) label. It is to be appreciated that traffic travelling between the cellular network and the WLAN can be encapsulated according to various aggregated-link protocols.

Figure 5:
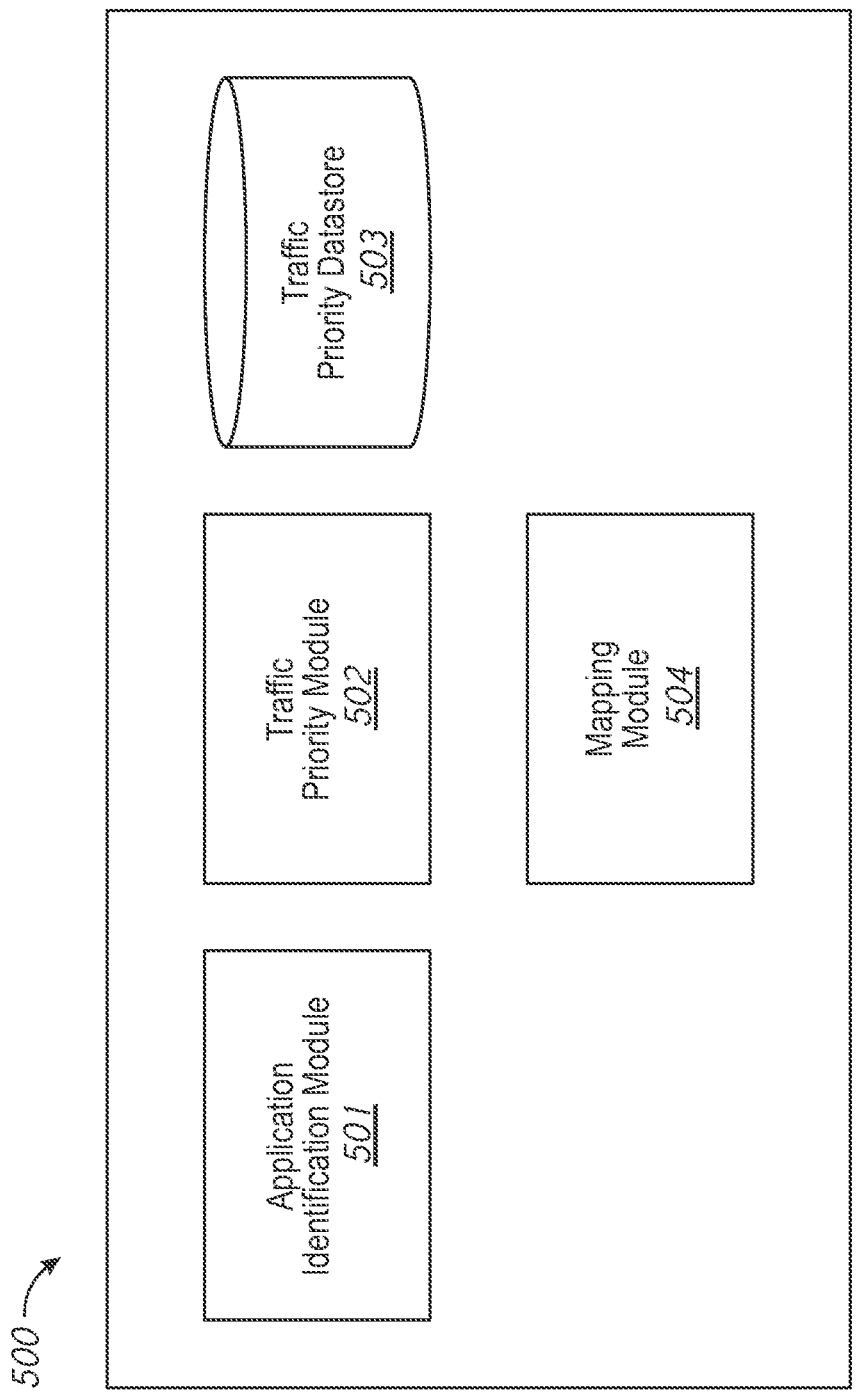
FIG. 5 is a conceptual diagram of a priority controller that translates priority information between networks.

FIG. 5 is a conceptual diagram of a priority controller 500, corresponding to controller 105 in FIG. 1, that maps priority information between a cellular network and WLAN. The priority controller 500 includes an application identification module 501 that functions to identify an application (or at least an application type) associated with traffic destined for a UE 101 via the WLAN link. In various implementations, the application identification module 501 resides at the cellular base station. The application identification module 501 can identify a variety of types of applications, such as but not limited to: email, file-sharing, gaming, peer-to-peer (P2P), video, voice, and voice-video, and OTT (Over The Top) applications (e.g., Cisco WebEx®, Cisco Jabber®, Lync, QuickTime, FaceTime, Skype, YouTube, Netflix, RTSP, RTP, SIP, H.323, RTCP, WhatsApp, Viber, Jabber, etc.). In some implementations, the application identification module 501 utilizes a packet filtering mechanism that examines the data part of a packet, packet patterns (e.g., packet size, occurrence, frequency, etc.), and optionally the header of a packet. An example of this type of packet filtering mechanism is DPI (Deep Packet Inspection). In various implementations, applications are identified at a node at the core network of the cellular network (e.g., at PGW node for an LTE deployment).

In various implementations, application types can be identified based on resource specifications of the application. For example, in various implementations, a real-time video application can be identified as an application type that is more resource-intensive than email. In various implementations, application types can be identified based on context. For example, in a working-context, email can be identified as a work-critical application type whereas a game can be identified as a non work-critical application type. For example, in a coffee shop context, a network operator can identify applications that are anticipated to be used by customers (e.g., email) while applications that are not anticipated to be used by customers (e.g., video editing).

In various implementations, the application identification module 501 identifies applications by providing a result of an UE-submitted directory query (e.g., a name server query, such as a DNS (domain name server) query) to another name server that provides results to queries directed to domains under its authoritative control (e.g., a DNS-AS (DNS as authoritative source) server), and obtaining an application identification from the authoritative name server. In some implementations, the application identification module 501 additionally obtains from a name server QoS (quality of service) classification information. In these implementations, the cellular base station is relieved from having to implement the application identification module 501.

In various implementations, the application identification module 501 resides on a server within the cellular network (e.g., a mobile edge computing (MEC) server) that provide computational and storage support to the cellular network. In various implementations, the server is co-located with the cellular base station. In various implementations, the server can host an application server. In various implementations, the server is separate from the cellular base station but can communicate the application identity to the cellular base station. In some implementations, the cellular base station is running a cell-site aggregation router or wired network in a service provider environment while communicating with the server.

The priority controller 500 includes a traffic priority module 502 that determines a traffic priority for traffic destined for the UE 101 through a WLAN link. In various implementations, the traffic priority is determined based on an application (or at least an application type) identified by the application identification module 501. In various implementations, the traffic priority includes a quality of service (QoS), such as bandwidth allocation. In various implementations, predetermined priority levels are stored in a traffic priority datastore 503, and used by the traffic priority module 502 in determining the traffic priority. For example, the traffic priority module 502 can determine that traffic associated with an OTT (Over the Top) application (e.g., FaceTime) has a relatively high priority compared with an email application based on entries in the traffic priority datastore 503. In various implementations, the predetermined priority levels are set by an operator of the WLAN and/or a network administrator. For example, an operator of a WLAN at a hotel could assign traffic associated with a voice and video application (e.g., Skype) to have the highest priority to ensure that the hotel's guests could make voice/video calls with a high level of reliability. For example, an operator of a company WLAN could assign relatively higher priorities to work-related applications (e.g., email) as compared with non-work-related applications, such as games (e.g., Candy Crush).

In various implementations, the traffic priority is determined based on conditions at the WLAN. The conditions can include the location of a WLC and/or access point, the location of the access point and/or WLC relative to a UE, and/or signal characteristics at the WLAN (e.g., RSSI, throughput, etc.). For example, in various implementations, the WLC can provide its location to the traffic priority module 502, and, if the traffic priority module 502 determines that the WLAN cannot provide adequate coverage (e.g., WLAN is in a deep cave) for applications having high network requirements (e.g., FaceTime), then the traffic priority module 502 can decide to increase the traffic priority for applications having lower requirements (e.g. email).

In various implementations, the traffic priority module 502 determines the traffic priority based on whether a criterion is satisfied. For example, in various implementations, the WLC can obtain a RF (radio frequency) threshold and/or measurements from the UE (e.g., through RRC (radio resource control) signaling), and the traffic priority module 502 determines the traffic priority based on whether the RF threshold is satisfied. In various implementations, the traffic priority module 502 determines the traffic priority by arbitration based on results of the measurements.

In various implementations, the traffic priority module 502 determines the traffic priority based on conditions at the cellular network. These conditions can include the location of a cellular base station relative to UEs and/or signal characteristics relating to the cellular network (e.g., RSSI, throughput, etc.). For example, in various implementations, the traffic priority module, after determining that the cellular network coverage is poor (e.g., indoors or far away from a cellular base station), generates an indication to route relatively high priority traffic to the WLAN (as opposed to the cellular network). This improves the quality of experience (QoE) of the users.

The priority controller includes a mapping module 504. The mapping module 504 provides the traffic priority determined by the traffic priority module 502 to the WLAN. In this way, the WLAN can forward traffic destined for a UE in accordance with the priority determined at the cellular network.

In various implementations, the mapping module 504 populates a header field of a packet provided to the WLAN with the traffic priority. For example, in some implementations, the mapping module 504 includes the traffic priority in a header field of a LWAAP packet provided to the WLAN. In some implementations, the mapping module 504 populates the header field with values corresponding to a DSCP (Differentiated Services Code Point) scheme.

Based on the received traffic priority, the WLAN determines a mapped traffic priority according to various implementation. The WLAN can apply the mapped traffic priority to different classes of traffic destined for the UE. In various implementations, the WLAN populates a header of a packet destined for the UE to indicate the mapped traffic priority. In various implementations, the header includes a class of service (CoS) value in accordance with IEEE 802.1p. In various implementations, the header includes a UP (User Priority) value pursuant to IEEE 802.11D.

In various implementations, the mapping module 504 provides the WLAN with the application identification as determined by the application identification module 501. In various implementations, the WLAN determines a QoS (quality of service) value to associate with the traffic towards the UE based on the application identification. For example, upon a WLAN operator receiving application identification of a type that is important to users of the WLAN (e.g., email at an Internet-Café), the WLAN could apply traffic markings to traffic associated with the identified application, wherein the traffic markings correspond to a relatively high priority QoS class.

In various implementations, the application identification module 501 and the mapping module 504 resides at a node within a cellular core network (e.g., the cellular core network 108 in FIG. 1). The mapping module 504 can provide the application identification (as identified by the application identification module 501) to the WLAN through the core network. For example, in various implementations, the application identification is sent to the WLAN via a GTP-U (GPRS Tunneling Protocol (GTP) user) header.

In various implementations, virtual LAN (VLAN) tagging (e.g., as defined in IEEE 802.1Q) is used to map traffic priority to the WLAN. In various implementations, the mapping module 504 provides a VLAN identifier and a priority code point (PCP) to the WLAN. In various implementations, the VLAN tagging is implemented via QCI (QoS class identifier)-to-PCP mapping. In various implementations, the WLAN determines an IEEE 802.11e user priority (UP) based on the PCP value and associates the UP with traffic towards the UE. For example, in various implementations, the mapping module 504 populates a LWAAP PDU header with the VLAN identifier and a 3-bit PCP value. The WLAN then translates the LWAAP PDU header to an IEEE 802.11 UP value that corresponds to the PCP value. In various implementations, the mapping module 504 can translate QCI into a DSCP value, which in turn can be translated into the UP.

In various implementations, the mapping module 504 provides encapsulated data packets to the WLAN that include the traffic priority. For example, in various LTE-deployment implementations, packet data convergence protocol (PDCP) protocol data units (PDUs) are encapsulated in LTE-WLAN Aggregation Adaptation Protocol (LWAAP) and sent to the WLAN.

Figure 6:
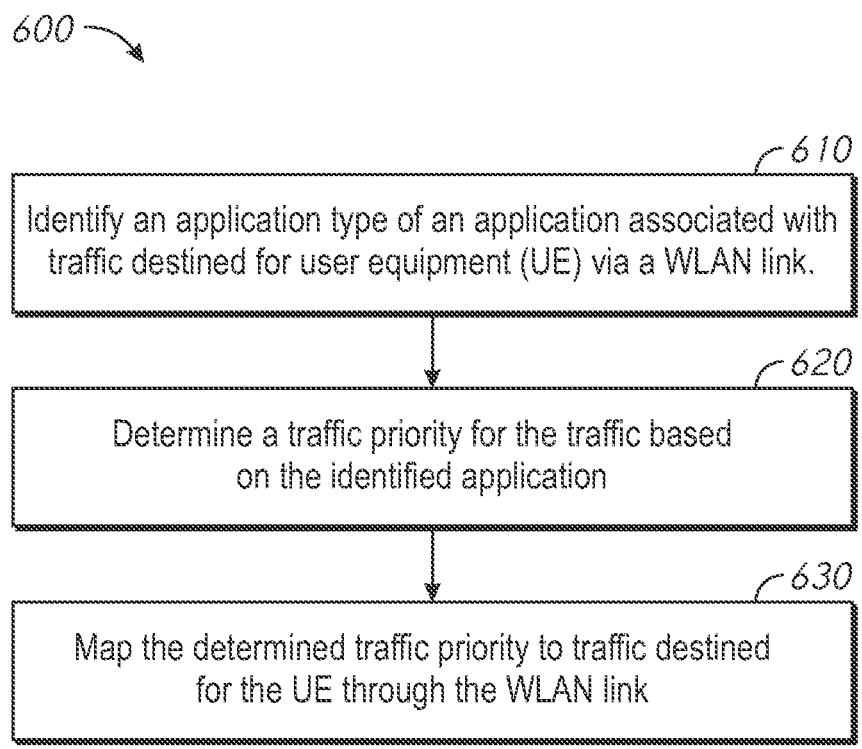
FIG. 6 is a flowchart representation of a method of marking network traffic in a link-aggregated network based on an application associated with the traffic.

FIG. 6 is a flowchart representation of a method 600 of marking network traffic in a link-aggregated network based on an application associated with the traffic. Method 600 or portions of method 600 can be implemented at one or more network components of a cellular network. In various implementations, one of the network components is a priority controller, such as the priority controller 500 of FIG. 5. In various implementations, one of the network components resides at an enclosure housing the priority controller and the cellular base station. In various implementations, one of the network components resides at an enclosure housing the priority controller but not the cellular base station. In various implementations, one of the network components resides at an enclosure housing the cellular base station but not the priority controller. In various implementations, the method 600 or a portion of method 600 is implemented at a node within a cellular core network, such as within the cellular core network 108 of FIG. 1. In some implementations, the method 600 is performed by processing logic, including hardware, firmware, software, or a combination thereof. In some implementations, the method 600 is performed by a processor executing code stored in a non-transitory computer-readable medium (e.g., a memory). Briefly, the method 600 includes transmitting, to a WLAN from a cellular network, data packets including an indication of priority for forwarding to an electronic device (e.g., user equipment (UE)), the indicating of priority being based on an application associated with the data packets.

The method 600 begins, at block 610, with the one or more network components identifying an application type of an application associated with traffic destined for a UE via the WLAN link. In various implementations, the identified application type encompasses a single application (e.g., the network components identify the application). In various implementations, the application type can encompass multiple variations of the application, such as different versions or different platforms (e.g., Android and/or iOS). In various implementations, the identified application type encompasses multiple applications. For example, the application type can be video conferencing, which may include WhatsApp, Skype, FaceTime, etc. The one or more network components can identify the application type according to various implementation disclosed in this application. The method 600 continues, at block 620, with the one or more network components determining a traffic priority for the traffic based on the application type identified at block 610. The one or more network components can determine the traffic priority according to various implementations disclosed in this application. The method 600 continues, at block 630, with the one or more network components mapping the traffic priority determined at block 620 to traffic destined for the UE through the WLAN link. The one or more network components can map the traffic priority according to various implementation disclosed in this application.

Figure 7:
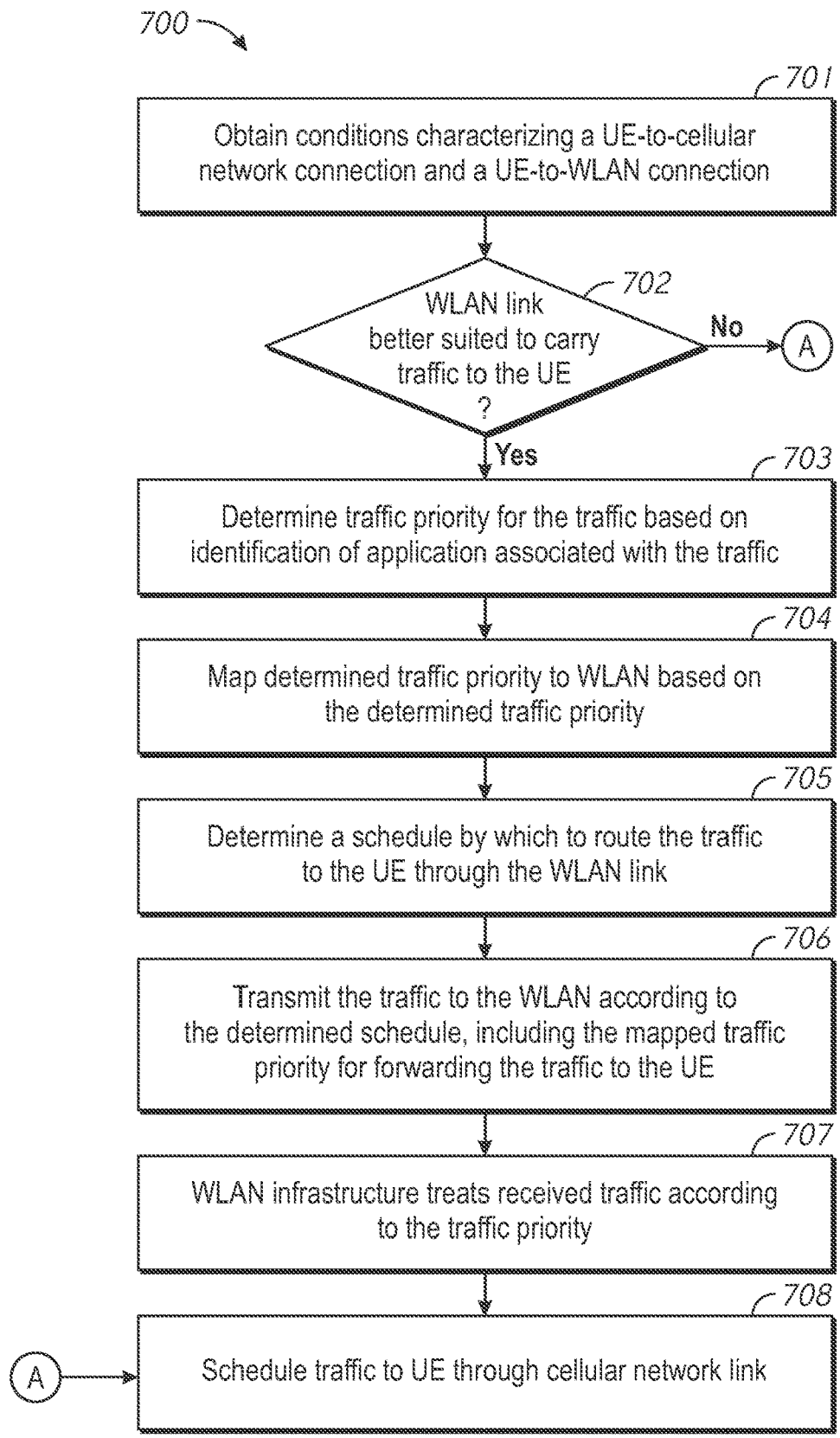
FIG. 7 is a depiction of a method of marking network traffic in a link-aggregated network based on the application associated with the traffic.

FIG. 7 is a depiction of a method 700 of marking network traffic in a link-aggregated network based on the application associated with the traffic. The method 700 or portions of the method 700 can be implemented at one or more network components of a cellular network. In various implementations, of the network components resides at a priority controller, such as the priority controller 500 of FIG. 5. In various implementations, one of the network components resides at an enclosure housing the priority controller and the cellular base station. In various implementations, one of the network components resides at an enclosure housing the priority controller but not the cellular base station. In various implementations, one of the network components resides at an enclosure housing the cellular base station but not the priority controller. In various implementations, the method 700 (or at least a portion thereof) is implemented at a node within a cellular core network, such as within the cellular core network 108 of FIG. 1. In some implementations, the method 700 is performed by processing logic, including hardware, firmware, software, or a combination thereof. In some implementations, the method 700 is performed by a processor executing code stored in a non-transitory computer-readable medium (e.g., a memory).

At step 701, the one or more network components obtain conditions characterizing a UE-to-cellular network connection and characterizing a UE-to-WLAN network connection. In various implementations, the network components obtain a first set of conditions characterizing the UE-to-cellular network connection and a second set of conditions characterizing the UE-to-WLAN network connection. In various implementations, the conditions include one or more of an RSSI (received signal strength indicator), an estimated throughput, jitter, signal-to-noise ratio (SNR), a latency, an error rate, a load, a transmission and/or reception rates, or various other signal quality indications indicating the state of the radio link (e.g., RF conditions).

At step 702, the one or more network components determines whether to route traffic to the UE through the WLAN link (rather than the cellular network link) based on the obtained conditions. An affirmative determination ("Yes") would be reached if, for example, the load (e.g., the number of UEs currently connected) of the cellular network was nearer to its capacity as compared with the load of the WLAN. If the determination is negative ("No"), then the traffic would be routed to the UE through the cellular network link at step 708.

If an affirmative determination is made, the method 700 continues to step 703. At step 703, the one or more network components determine a traffic priority for the traffic based on identification of application type associated with the traffic. The application type can be identified according to various implementations disclosed herein. The traffic priority can be determined according to various implementations disclosed herein.

The method 700 continues to step 704, where the one or more network components map the determined traffic priority to WLAN based on the determined traffic priority. The mapping can occur according to various implementations disclosed in this application.

The method 700 continues to step 705, where the one or more network components determine a schedule by which to route the traffic to the UE through the WLAN link. The determining a schedule can occur according to various implementations disclosed herein.

The method 700 continues to step 706, where the one or more network components transmit the traffic to the WLAN according to the determined schedule, wherein the transmission includes data indicative of the mapped traffic priority for forwarding the traffic to the UE. The transmission can occur according to various implementations disclosed in this application.

The method 700 continues to step 707, where the WLAN infrastructure (e.g., access point(s) and/or wireless LAN controller(s) (WLC)) receive the traffic and the traffic priority. Based on the traffic priority, the WLAN infrastructure forwards the traffic to the UE. In various implementations, the WLAN infrastructure can map the traffic priority to corresponding priority parameter(s) for traffic towards the UE, using a static and/or dynamic mapping policy. In various implementations, the WLAN infrastructure can map the traffic priority to access categories (AC) parameters (e.g., AC_VO, AC_VI, AC_BE, AC_BK). In various implementations, the WLAN infrastructure maps the traffic priority to an IEEE 802.11e user priority (UP) parameter. For example, if the traffic priority indicates that the application is high priority (e.g., a DSCP value of 46), the WLAN infrastructure can assign associated traffic a correspondingly high priority value (e.g., access category (AC) value of "AC_VO" for voice).

Figure 8:
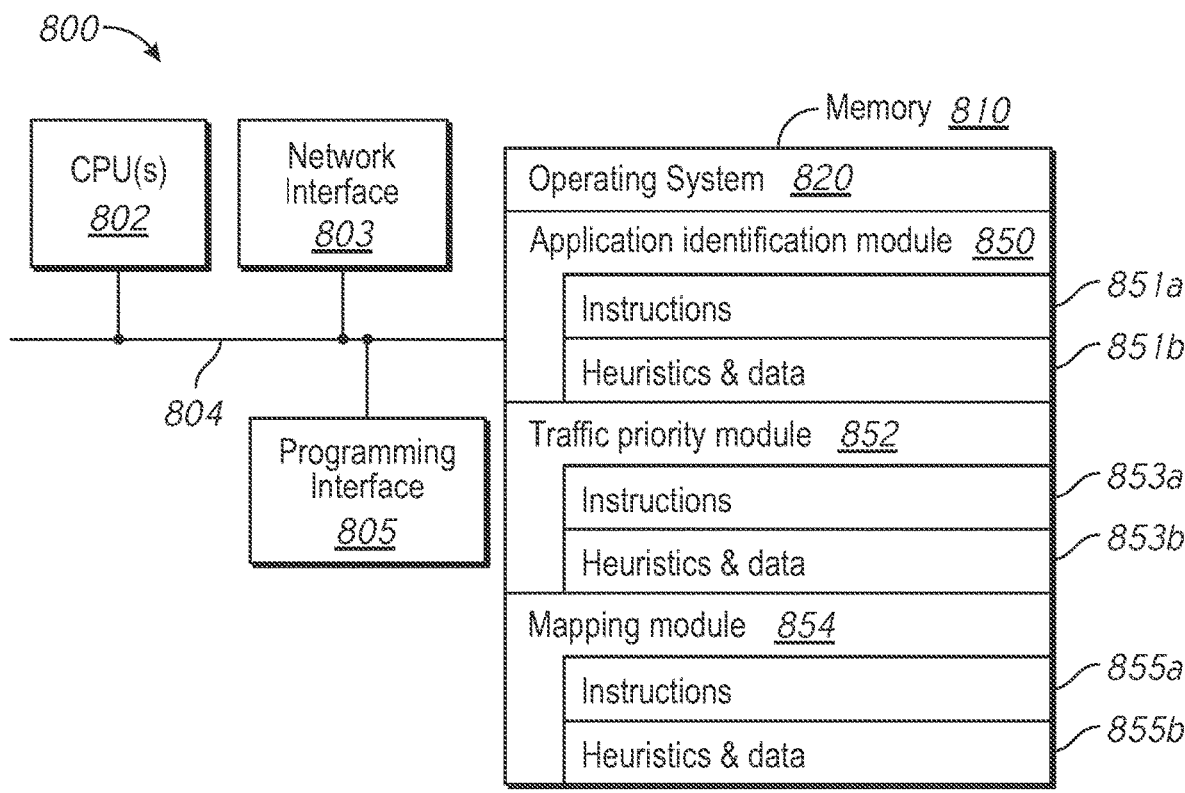
FIG. 8 is a block diagram of an example of a device in accordance with some implementations.

FIG. 8 is a block diagram of an example of a device 800 in accordance with some implementations. For example, in some implementations, the device 800 is similar to and adapted from the priority controller 500 in FIG. 5. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units (CPU's) 802, a network interface 803, a memory 810, a programming (I/O) interface 805, and one or more communication buses 804 for interconnecting these and various other components. In some implementations, the one or more communication buses 804 include circuitry that interconnects and controls communications between system components.

The memory 810 includes high-speed random access memory, such as DRAM, SRAM, DDR RAM, or other random access solid state memory devices. In some implementations, the memory 810 includes non-volatile memory, such as one or more magnetic disk storage devices, optical disk storage devices, flash memory devices, or other non-volatile solid state storage devices. The memory 810 optionally includes one or more storage devices remotely located from the one or more CPUs 802. The memory 810 comprises a non-transitory computer readable storage medium. In some implementations, the memory 810 or the non-transitory computer readable storage medium of the memory 810 stores the following programs, modules and data structures, or a subset thereof including an optional operating system 820, an application identification module 850, a traffic priority module 852, and a mapping module 854.

The operating system 820 includes procedures for handling various basic system services and for performing hardware dependent tasks.

The application identification module 850 is configured to identify an application associated with traffic according to various implementations describe in this application. To that end, in various implementations, the application identification module 850 includes instructions and/or logic 851a, and heuristics and data 851b.

The traffic priority module 852 is configured to determine a priority for traffic destined to a UE through a WLAN link based on the identified application according to various implementations describe in this application. To that end, in various implementations, the traffic priority module 852 includes instructions and/or logic 853a, and heuristics and data 853b.

The mapping module 854 is configured to obtain map the determine traffic priority to the WLAN. Based on this information, infrastructure at the WLAN can treat the traffic accordingly, such as through mapping methods disclosed in this application (e.g., DSCP to UP mapping). To that end, in various implementations, the mapping module 854 includes instructions and/or logic 855a, and heuristics and data 855b.

Although the application identification module 850, the traffic priority module 852, and the mapping module 854 are illustrated as residing on a single device (i.e., the device 800), it should be understood that in other implementations, any combination of the application identification module 850, the traffic priority module 852, and the mapping module 854 can reside in separate computing devices. For example, each of the application identification module 850, the traffic priority module 852, and the mapping module 854 can reside on a separate device.

Moreover, FIG. 8 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    receiving, at a controller of a cellular wireless network, one or more data packets destined for an electronic device and associated with an application;
    identifying, by the controller of the cellular wireless network, an application type of the application based on the one or more data packets;
    determining, by the controller of the cellular wireless network, to route the one or more data packets to the electronic device via a Wireless Local Area Network (WLAN) rather than the cellular wireless network based on a comparison between first conditions characterizing a first capability of a first connection between the WLAN and the electronic device and second conditions characterizing a second capability of a second connection between the cellular wireless network and the electronic device; determining, by the controller of the cellular wireless network, a priority of the one or more data packets based on the application type and the first conditions characterizing the first capability of the first connection between the WLAN and the electronic device; and
    transmitting, by the controller of the cellular wireless network, to the WLAN for forwarding, via the WLAN, to the electronic device, the one or more data packets including a header that includes information indicative of the priority in order to allow the WLAN to deliver the one or more data packets to the electronic device in accordance with the priority of the one or more data packets,
    wherein the one or more data packets are transmitted to the WLAN according to LTE-WLAN Aggregation Adaptation Protocol (LWAAP) or according to LTE-WLAN Radio Level Integration with IPsec Tunnel (LWIP) and the header includes a data radio bearer identifier field and values corresponding to a Differentiated Services Code Point (DSCP) scheme and indicative of the priority, and
    wherein identifying the application type of the application and determining the priority of the one or more data packets are based on the application type occurring at a mobile edge computing (MEC) server at the cellular wireless network, the MEC server providing computational and storage support.

2. The method of claim 1, wherein the one or more data packets including the header that includes the information indicative of the priority are transmitted to the WLAN according to the LWAAP.

3. The method of claim 1, wherein the one or more data packets including the header that includes the information indicative of the priority are transmitted to the WLAN according to the LWIP.

4. The method of claim 1, wherein the one or more data packets including the header that includes the information indicative of the priority are transmitted to the WLAN in response to a determination that the comparison between the first conditions of the first connection and the second conditions of the second connection satisfy a criterion.

5. The method of claim 4, wherein the first conditions of the first connection characterize a capability of the WLAN to forward the one or more data packets according to the priority of the one or more data packets, and the second conditions of the second connection characterize a capability of the cellular wireless network to forward the one or more data packets according to the priority of the one or more data packets.

6. The method of claim 5, wherein each of the first conditions of the first connection and the second conditions of the second connection is indicative of at least one: received signal strength indicator (RSSI), estimated throughput, signal-to-noise ratio (SNR), jitter, latency, loss, error rate, network load, subscription rate, transmission rate, or reception rate.

7. The method of claim 1, wherein the application type is identified based on at least one of resource specifications of the application or context.

8. The method of claim 1, wherein determining the priority of the one or more data packets is based at least in part on the first conditions and the second conditions.

9. The method of claim 1, wherein the information indicative of the priority includes a virtual LAN (VLAN) identifier and a priority parameter.

10. A system comprising:
    a priority controller in a cellular wireless network, wherein the priority controller is configured to receive, via the cellular wireless network, one or more data packets destined for an electronic device and associated with an application, wherein the priority controller is configured to make a determination to route the one or more data packets to the electronic device via a Wireless Local Area Network (WLAN) rather than the cellular wireless network based on a comparison between first conditions characterizing a first capability of a first connection between the WLAN and the electronic device and second conditions characterizing a second capability of a second connection between the cellular wireless network and the electronic device;
    an application identification module in the cellular wireless network, wherein the application identification module is configured to identify an application type of the application based on the one or more data packets;
    a traffic priority module in the cellular wireless network, wherein the traffic priority module is configured to determine a priority of the one or more data packets based on the application type and the first conditions characterizing a the first capability of a the first connection between the WLAN and the electronic device; and
    a mapping module in the cellular wireless network, wherein the mapping module is configured to transmit, to the WLAN for forwarding, via the WLAN, to the electronic device, the one or more data packets including a header that includes information indicative of the priority in order to allow the WLAN to deliver the one or more data packets to the electronic device in accordance with the priority of the one or more data packets,
wherein the one or more data packets are transmitted to the WLAN according to LTE-WLAN Aggregation Adaptation Protocol (LWAAP) or according to a LTE-WLAN Radio Level Integration with IPsec Tunnel (LWIP) and the header includes a data radio bearer identifier field and values corresponding to a Differentiated Services Code Point (DSCP) scheme and indicative of the priority, and
wherein the application identification module identifies the application type of the application and the traffic priority module determines the priority of the one or more data packets, based on the application type occurring at a mobile edge computing (MEC) server at the cellular wireless network, the MEC server providing computational and storage support.

11. The system of claim 10, wherein the mapping module is configured to transmit the one or more data packets including the header that includes the information indicative of the priority according to the LWAAP.

12. The system of claim 10, wherein the mapping module is configured to transmit the one or more data packets including the header that includes the information indicative of the priority according to the LWIP.

13. The system of claim 10, wherein the one or more data packets including the header that includes the information indicative of the priority are transmitted to the WLAN in response to a determination that the comparison between the first conditions and the second conditions satisfy a criterion.

14. The system of claim 13, wherein each of the first conditions and the second conditions is indicative of at least one: received signal strength indicator (RSSI), estimated throughput, latency, jitter, signal-to-noise ratio (SNR), loss, error rate, network load, subscription rate, transmission rate, or reception rate.

15. The system of claim 10, wherein the traffic priority module is configured to determine the priority of the one or more data packets based at least in part on the first conditions or the second conditions.

16. A non-transitory memory storing one or more programs, the one or more programs comprising instructions, which, when executed by one or more processors of a cellular networking device in a cellular wireless network, cause the cellular networking device to:
    receive, via the cellular wireless network, one or more data packets destined for an electronic device and associated with an application;
    identify an application type of the application based on the one or more data packets;
    determine to route the one or more data packets to the electronic device via a Wireless Local Area Network (WLAN) rather than the cellular wireless network based on a comparison between first conditions characterizing a first capability of a first connection between the WLAN and the electronic device and second conditions characterizing a second capability of a second connection between the cellular wireless network and the electronic device;
    determine a priority of the one or more data packets based on the application type and the first conditions characterizing the first capability of a the first connection between the WLAN and the electronic device; and
    transmit, to the WLAN for forwarding, via the WLAN, to the electronic device, the one or more data packets including a header that includes information indicative of the priority in order to allow the WLAN to deliver the one or more data packets to the electronic device in accordance with the priority of the one or more data packets,
wherein the one or more data packets are transmitted to the WLAN according to LTE-WLAN Aggregation Adaptation Protocol (LWAAP) or according to LTE-WLAN Radio Level Integration with IPsec Tunnel (LWIP) and the header includes a data radio bearer identifier field and values corresponding to a Differentiated Services Code Point (DSCP) scheme and indicative of the priority, and
wherein the instructions, when executed, cause the cellular networking device to identify the application type of the application and to determine the priority of the one or more data packets, based on the application type occurring at a mobile edge computing (MEC) server at the cellular wireless network, the MEC server providing computational and storage support.

17. The non-transitory memory of claim 16, wherein the instructions, when executed, cause the cellular networking device to transmit the one or more data packets including the header that includes the information indicative of the priority according to the LWAAP.

18. The non-transitory memory of claim 16, wherein the instructions, when executed, cause the cellular networking device to transmit the one or more data packets including the header that includes the information indicative of the priority according to the LWIP.

19. The non-transitory memory of claim 16, wherein the one or more data packets including the header that includes the information indicative of the priority are transmitted to the WLAN in response to a determination that the comparison between the first conditions and the second conditions satisfy a criterion.

20. The non-transitory memory of claim 19, wherein each of the first conditions and the second conditions is indicative of at least one of: received signal strength indicator (RSSI), estimated throughput, signal-to-noise ratio (SNR), jitter, latency, loss, error rate, network load, subscription rate, transmission rate, or reception rate.

21. The non-transitory memory of claim 16, wherein the application type is identified based on at least one of resource specifications of the application or context.

22. The non-transitory memory of claim 16, wherein determining the priority of the one or more data packets is based at least in part on the first conditions and second conditions.

23. The system of claim 10, wherein the application identification module identifies the application type based on at least one of resource specifications of the application or context.

* * * * *

UNITED STATES PATENT AND TRADEMARK OFFICE
CERTIFICATE OF CORRECTION

PATENT NO. : 11,071,004 B2  
APPLICATION NO. : 15/792614  
DATED : July 20, 2021  
INVENTOR(S) : Indermeet Singh Gandhi et al.

Page 1 of 1

It is certified that error appears in the above-identified patent and that said Letters Patent is hereby corrected as shown below:

In the Claims

Claim 22, Column 16, Line 12, please replace "conditions and second" with --conditions and the second--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*